March 16, 1965

H. JAUN 3,174,065

ELECTRIC DRIVE WORKING AT TWO SPEEDS
AND CONSISTING OF TWO MOTORS

Filed March 21, 1961

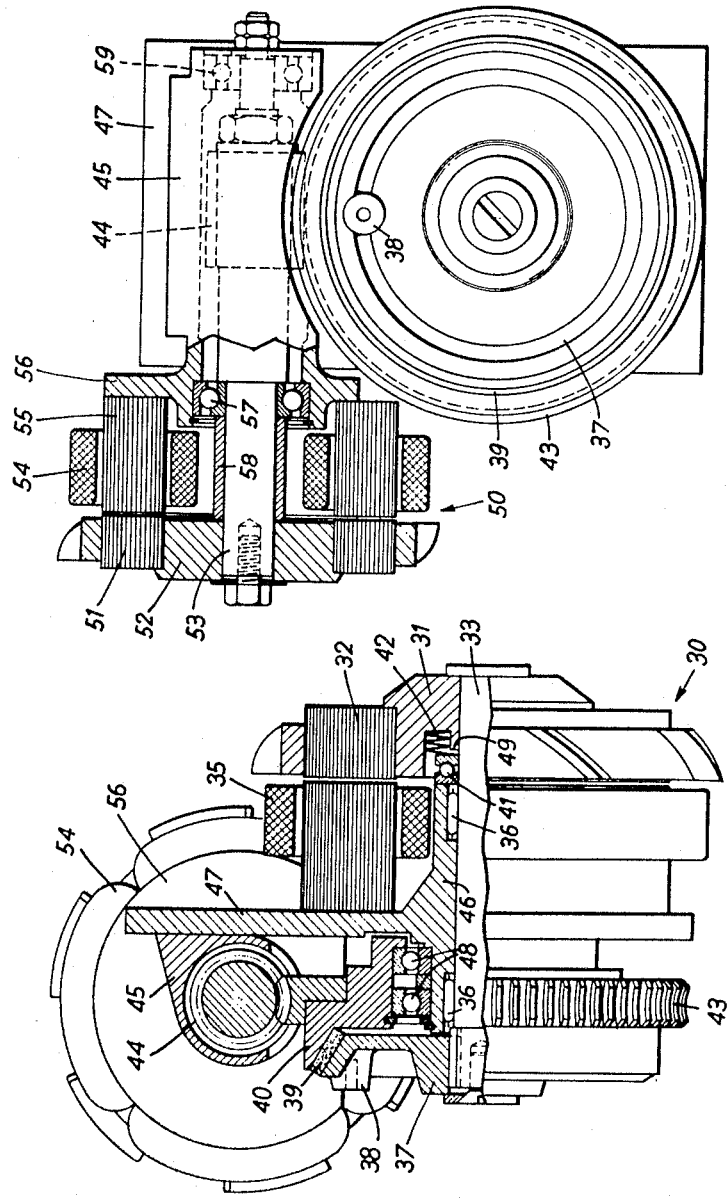

United States Patent Office 3,174,065
Patented Mar. 16, 1965

3,174,065
ELECTRIC DRIVE WORKING AT TWO SPEEDS AND CONSISTING OF TWO MOTORS
Hermann Jaun, Regensdorf, Zurich, Switzerland, assignor to Elektro-Motoren AG, a corporation of Switzerland
Filed Mar. 21, 1961, Ser. No. 97,267
Claims priority, application Switzerland, Mar. 24, 1960, 3,319/60
4 Claims. (Cl. 310—78)

This invention relates to an electric drive working at two speeds and consisting of two motors.

For the propelling of lifting tackle as well as of tool machinery, textile machines, washing machines and the like it is quite often desirable to have at least two speeds. These requests have so far been met amongst other solutions by applying two motors working on the same driving shaft which have different speeds and which are coupled immediately or by means of an intermediate gear. For these motors electric machines of radial design equipped with a tapered, axially displaceable rotor and a brake are used. In this case the brake of the motor adjacent to the shaft of the propelled machinery serves for transmitting the torque from the other motor to said shaft as long as the first motor is switched off. When switching on the motor adjacent to the shaft of the driven machine its connection to the other motor is dissolved. If this motor is switched off again, its brake is reset. During the starting-up of the other motor the brake of the first mentioned motor serves as a coupling.

This motor arrangement not only leads to undesirably high costs caused by the application of two motors of radial design; it further has the disadvantage of consuming too much space and of resulting in an axial force as supplied by the tapered rotor which is relatively small, so that the coupling spring acting on the shaft cannot be made too strong without resorting to special measures.

These disadvantages are overcome by the drive according to the invention. This drive is principally characterized by the fact that one motor is of the axial design with a displaceable rotor, on whose shaft there is mounted on one end a clutch actuated by the axial displacement which, when this motor is switched off, transmits the torque deriving from the other motor on the shaft of the motor having the displaceable rotor by means of a transmission.

In the drawings two embodiments of the invention are shown by way of example.

FIGS. 2 and 3 show a second embodiment, partly in section, in which the speed ratio exceeds 1:15.

Figure 1:
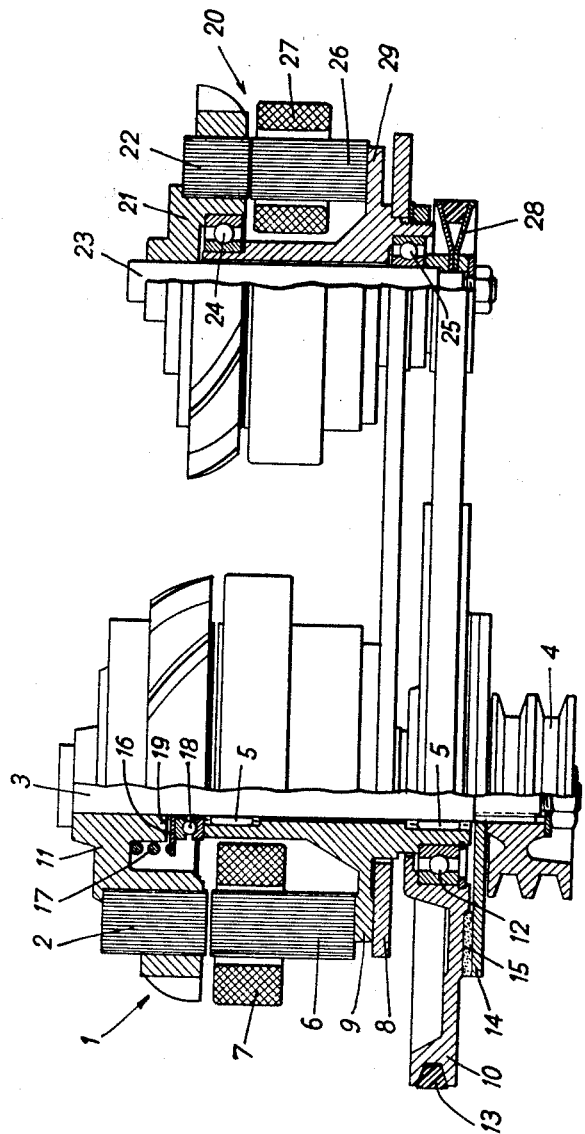
FIG. 1 shows a first embodiment, partly in section, in which the speed ratio does not exceed 1:15.

According to FIG. 1, motors 1 and 20 are two induction motors of axial design as e.g. described in the Swiss Patent No. 274,350. The speeds of these two motors may be equal. The rotor 2 of motor 1 is of the squirrel cage type and mounted by means of a rotor body 11 on a shaft 3 carrying at its end a V belt sheave 4. The shaft 3 is rotatably mounted on two needle bearings 5 arranged in a stator body of a stator 6. The needle bearings 5 may be replaced by journal bearings. The stator 6 has a winding 7 and rests on a mounting flange 8. At one end of the stator body 9 a V belt sheave 10 is mounted rotatably on a ball bearing 12. The sheave 10 is driven by a V belt 13. On a shaft 3 a coupling disc 14 is arranged between two V belt sheaves 4 and 10. The sheave 10 carries on the side facing the coupling disc 14 a friction lining 15. Between the rotor body 11 and a spring seat 16 a spring 17 is located. The spring seat 16 rests by means of a ball bearing 18 on the stator body 9.

The motor 20 is of the same design as motor 1. On a shaft 23 lying parallel to the shaft 3 of motor 1 a rotor 22 is mounted by means of a rotor body 21. A stator 26 with winding 27 is suspended from a mounting flange 8 by means of a stator body 29. Between the stator body 29 and the rotor body 21 a ball bearing 24 is arranged. Similarly a ball bearing 25 is provided between the stator body 29 and the shaft 23. One end of the shaft 23 carries a V belt sheave 28 on which the V belt 13 runs.

The drive according to FIG. 1 operates as follows. If the motor 1 is at standstill, the take-off sheave 4 is coupled with the sheave 10 for being driven by the motor 20. After the motor 20 has been switched on, the sheave 4 rotates at a speed corresponding to the speed of the motor 20 and the transmission ratio. If motor 1 is now switched on, the rotor 2 lifts the coupling disc 14 off the lining 15 against the action of the spring 17 due to the magnetic pull acting in axial direction between stator 6 and rotor 2. The rotor 2 displaces itself in axial direction, and this displacement depends upon the distance of the support face 19 of the rotor body 11 and the spring seat 16. Thus the V belt sheave 4 is uncoupled from the V belt sheave 10 and is driven by the motor 1 at a corresponding speed. The motor 20 can be switched off. If now motor 1 is switched off, the spring 17 resets the rotor 2 into its original position, and the V belt sheave 4 is again coupled to the sheave 10.

The spring 17 can be selected sufficiently strong in order to transmit the torque originated by the motor 20 onto the shaft 3 whereby the coupling elements may be relatively small. The axial thrust originated by the motor 1 is relatively large and the resultant of this thrust is parallel to the displacement of the rotor 2.

The motor 20 may not necessarily be a motor of axial design. It is, however, advantageous to use on axial motor 20 due to its relatively small overall dimensions and its low costs.

If the speed ratio of the sheave exceeds about 1:15, the diameter of the sheave 10 becomes relatively large and the embodiment according to FIG. 1 is no longer suitable.

The embodiment according to FIGS. 2 and 3 can be used with advantage if the speed ratio of the driving element exceeds about 1:15. The motor 30 is of the same design as the motor 1 of FIG. 1. The rotor 32 is of the squirrel cage type and mounted on a shaft 33 by means of a rotor body 31. The shaft 33 is rotatably supported on two needle bearings 36, mounted in a stator body 46 of a stator 34. The needle bearings 36 may be replaced by journal bearings. The stator 34 has a winding 35 and is suspended from a mounting flange 47. A coupling disc 37 is mounted on one end of the shaft 33. The disc 37 has an eye 38 to receive a take-off device. Between a plate 40 is provided with a friction lining 39 on the side facing the disc 37. A spring 42 is mounted between the rotor body 31 and a ball bearing 41. The bearing 41 rests against the stator body 46. On the plate 40 a gear 43 is mounted engaging with a worm gear 44.

The motor 50 is of the same design as the motor 20 of FIG. 1. The rotor 51 is of the squirrel cage type and is mounted on a shaft 53 by means of a rotor body 52. The stator 55 with winding 54 is mounted on a stator body 56. The body 56 has a cylindrical extension. Between the stator body 56 and the shaft 53 there are two ball bearings 57, 59. A cylindrical piece 58 serves as a spacer. On the shaft 53 the worm gear 44 is mounted and protected by a cylindrical shaped hood 45. The hood is mounted on the flange 47.

The drive according to FIGS. 2 and 3 operates as follows: If the motor 30 is switched off, the coupling disc 37 is coupled with the gear 43. The motor 50, when switched on, drives the disc 37 through the worm gear 43, 44. The speed depends upon the speed of the motor 50 and upon the speed ratio of the gear 43, 44. If motor 30 is now switched on, the rotor 32 lifts the coupling disc 37 off the lining 39 due to the magnetic pull between stator 34 and rotor 32 acting in axial direction. The rotor 32 displaces itself in axial direction and the size of this displacement depends upon the distance between the support face 49 of the rotor body 31 and the ball bearing 41. Thus the coupling disc 37 is uncoupled from the worm gear 43, 44 and is being driven by the motor 30 at the corresponding speed. The motor 50 can be switched off. If now the motor 30 is switched off, the spring 42 resets the rotor 32 into its original position and the disc 37 is again coupled with the worm gear 43, 44.

By using motors 30 and 50 of axial design the same advantages are obtained as for the embodiment according to FIG. 1. Motor 50 may not be of axial design.

The embodiment according to FIG. 1 is quite advantageous for medium speed ratios and the embodiment according to FIGS. 2 and 3 is of advantage for high speed ratios.

Furthermore it is possible to use motors other than induction motors, e.g. collector, synchronous and hysteresis motors.

The drive described above enables a cost reduction of 30 to 50% against conventional two-speed drives. This is possible due to the use of axial motors of a very simple design and a low price, and due to the application of a very effective and simple clutch.

What I claim is:

1. A two speed electric drive comprising a first electric motor having a fixed stator and a rotor on a shaft which is movable axially in one direction relative to the stator upon energization of the first motor, spring means urging said rotor shaft in the opposite axial direction upon deenergization of the first motor, a second motor adapted to be energized upon deenergization of said first motor, and a clutch including a driving element connected through transmission means with said second motor for rotation upon energization of the latter and a driven element secured on said rotor shaft and engaged with said driving element upon displacement of said rotor shaft by said spring means in said opposite axial direction;

characterized in that said first motor has a stator body carrying said stator and in which said rotor shaft is journalled with the ends of said shaft projecting beyond said body, said rotor is mounted on one of said ends of the shaft with an axial air gap between said stator and rotor, said driven clutch element is mounted on the opposite end of the rotor shaft, and at least one ball bearing supports said driving clutch element on said stator body adjacent said opposite end of the rotor shaft.

2. A two speed electric drive as in claim 1; wherein said second motor also has a rotor and stator with an axial air gap therebetween.

3. A two speed electric drive as in claim 1; wherein said driving element of the clutch is in the form of a pulley, and said transmission means includes a pulley driven by said second motor and a belt running around both pulleys.

4. A two speed electric drive as in claim 1; wherein said spring means includes a compression spring seating at one end against said rotor and, at the other end, against a ball bearing engaging the adjacent portion of said stator body.

References Cited by the Examiner
UNITED STATES PATENTS

| | | | |
|---|---|---|---|
| 1,038,494 | 9/12 | Nelson | 310—78 |
| 2,461,659 | 2/49 | Rouse | 310—112 |
| 2,578,837 | 12/51 | Raney | 310—112 |
| 2,666,863 | 1/54 | Davis et al. | 310—112 |
| 2,683,232 | 7/54 | Weissheimer | 310—268 |
| 2,724,067 | 11/55 | Herrick | 310—268 |

FOREIGN PATENTS

| | | |
|---|---|---|
| 813,160 | 5/37 | France. |
| 532,362 | 8/55 | Italy. |

MILTON O. HIRSHFIELD, *Primary Examiner.*